Figure 1:
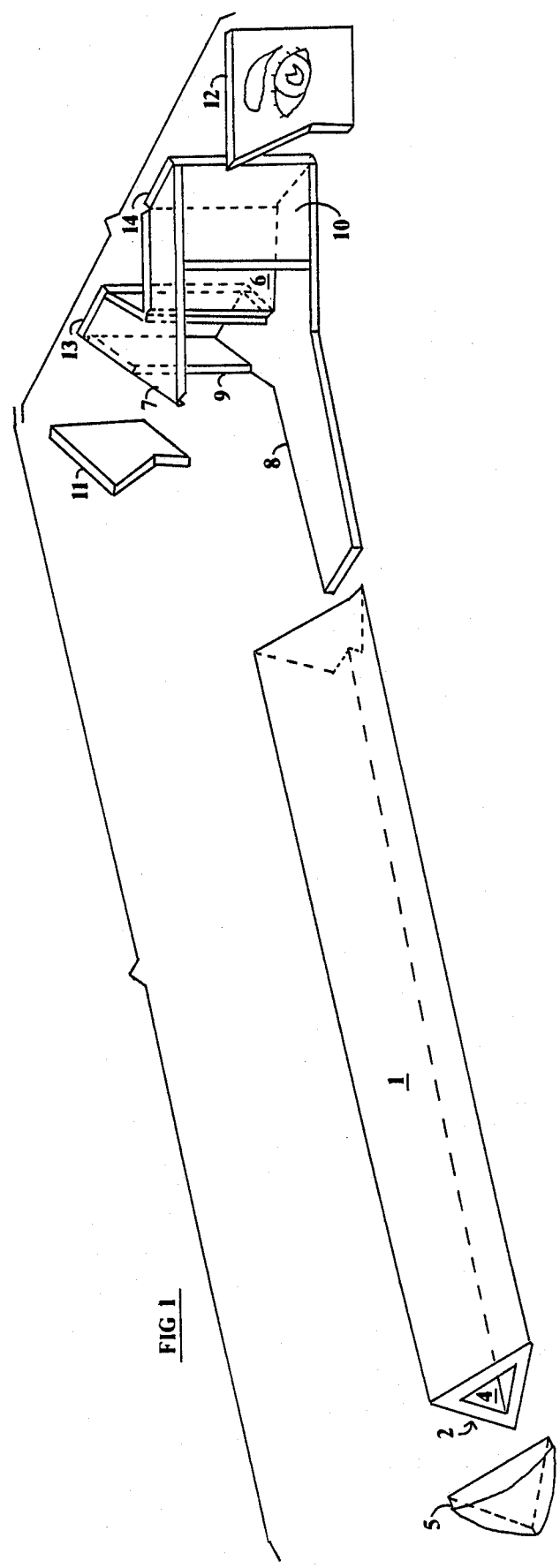

United States Patent [19]

Briskin

[11] Patent Number: 4,820,004

[45] Date of Patent: Apr. 11, 1989

[54] BINOCULAR KALEIDOSCOPE

[76] Inventor: Jonathan K. Briskin, 24 Dearborn Rd., Medford, Mass. 02155

[21] Appl. No.: 880,579

[22] Filed: Jun. 30, 1986

[51] Int. Cl.⁴ .............................................. G02B 23/00
[52] U.S. Cl. .................................................. 350/4.1
[58] Field of Search ................................. 350/4.1, 4.2

[56] References Cited

U.S. PATENT DOCUMENTS 2,697,380 12/1954 Wyser ............................ 350/4.1 X
3,514,178 5/1970 Toney ................................ 350/4.1

Primary Examiner—Richard A. Wintercorn

[57] ABSTRACT

The invention relates to new and useful improvements in a kaleidoscope assembly. The primary object being to provide a kaleidoscope with a single pattern-producing device and a single reflecting tube provided with a binocular eyepiece assembly which allows the varying composite image produced by the kaleidoscope to be viewed comfortably with two eyes simultaneously.

3 Claims, 1 Drawing Sheet

U.S. Patent    Apr. 11, 1989    4,820,004

BINOCULAR KALEIDOSCOPE

This invention relates to new and useful improvements in a kaleidoscope assembly and has for its primary object to provide, in a manner as hereinafter set forth, a kaleidoscope provided with a binocular eyepiece assembly which allows the kaleidoscope to be viewed comfortably with two eyes simultaneously.

Kaleidoscopes of various forms are known in the art to include assemblies provided with an elongated hollow body part having an eyepiece at one end. The body part has a V-shaped reflector mounted in it to extend between the eyepiece end and the end opposite thereto. The reflector generally defines an opening adjacent to the end opposite the eyepiece, the field of vision observed through the eyepiece being restricted along the reflector. At the end opposite the eyepiece an assembly is generally provided to produce a varying pattern in front of the second end, with the real image observed there combining with the mirror images from the reflector to produce the well-known illusionary image at the eyepiece. The pattern-producing producing assembly opposite the eyepiece may be of various forms: the most familiar being a rotateable transparent enclosure contaning a number of pattern-producing objects which tumble when the enclosure is rotated. Other pattern-producing assemblies known in the art include, among others, rotatable discs of stained glass, moveable colored glass balls and transparent glass or plastic spheres or lenses, in which case the pattern produced is a distorted image of the environment in front of the kaleidoscope refracted in the glass sphere or lens. The eyepiece conventionally consists of a small opening which allows viewing of the kaleidoscopic image with only one eye. This necessitates that the user close or cover one eye in order to appreciate the image seen by the other eye at the eyepiece of the kaleidoscope.

The present invention provides a kaleidoscope which is straightforward and inexpensive in construction, which departs from the conventional eyepiece by providing a binocular assembly which allows the kaleidoscopic image to be viewed simulateously with both eyes, thereby eliminating the need to close or cover one eye and allowing the user to view the image in a more natural and comfortable fashion, reducing eyestrain and fatigue which can interfere with use of the toy.

Figure 2:
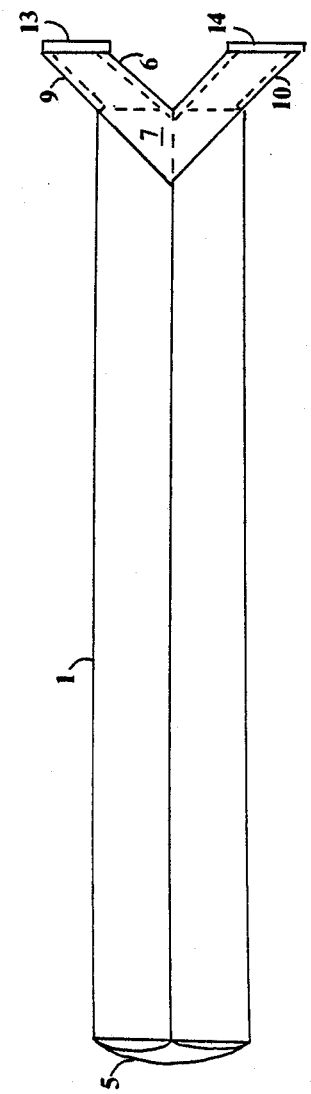

These objects and advantages, together with others which will become subsequently apparent, reside in the details of construction and operation as more fully hereinafter described and claimed, reference being made to the accompanying drawings forming a part hereof, wherein like numerals refer to like parts throughout, and in which:

FIG. 1 is an exploded view of the kaleidoscope.
FIG. 2 is a top view of the kaleidoscope.

Referring to FIGS. 1 and 2 of the drawings, the inventive kaleidoscope assembly includes an elongated housing of triangular cross-section 1, which can be made from any number of suitably stiff materials such as cardboard, plastic or wood. The housing 1 is provided, for purposes of description and orientation, with aligned front end 2 and rear end 3. The housing is lined by a suitable reflective material 4, advantageously made from three elongated rectangular glass mirrors attached to the inside of the housing. Adjacent front end 2 is a triangular convex lens 5 advantageously made from a suitable plastic material. Adjacent rear end 3 is a wedge-shaped reflecting member 6 made of two rectangular mirrors mounted at right angles to each other, with their reflecting surfaces facing outward. The top edges of the wedge-shaped reflecting member 6 is attached to the inside edges of the right-angled notch in the V-shaped upper support member 7. The bottom edges of the wedge-shaped reflecting member 6 are attached to the inside edges of the right-angled notch in the Y-shaped lower support member 8. The upper and lower support members 7 and 8 are advantageously made of plastic or wood. To the left and right of the wedge-shaped reflector 6, are two rectangular mirrors 9 and 10 whose reflecting surfaces are facing and are parallel to the mirrors which make up the wedge-shaped reflector 6. The top and bottom edges of these mirrors 9 and 10 are attached to the outside edges of the upper support member 7 and the lower support member 8 respectively. The rectangular tongue of the lower support member 8 is attached to the bottom of the housing 1. A triangular groove located in the midline of the underside of the upper support member 7 fits over and is attached to the top of the housing 1. Attached to the non-reflecting surfaces of each of the rectangular mirrors 9 and 10 is a covering piece 11 and 12, advantageously made of wood or plastic. The tops of the covering pieces 11 and 12 extend forward to lie flush with the top of the housing 1. The bottom corners of the housing 1 at the rear end 3 extend to lie flush with the bottom of each covering piece, 11 and 12. The outer surface of each covering piece 11 and 12 can be decorated with a picture of an eye and eyebrow so that the kaleidoscope assembly is also a whimsical, long-nosed mask, with housing 1 as the nose. The rear edges of the mirrors 6, 9, and 10 and the rear edges of the support members 7 and 8 define the rectangular viewing openings. These viewing openings are each covered by a transparent plastic rectangle 13 and 14.

From the description herein, it can readily be seen that a unique, attractive, straightforward binocular kaleidoscope assembly is provided. It is to be understood that various changes can be made by one skilled in the art in the construction of the apparatus disclosed, without departing from the scope or spirit of the present invention. For example, instead of the mirrors employed in the binocular eyepiece assembly taught by the present invention, an assembly utilizing prisms could be substituted. Further, the rigid form of the binocular eyepiece assembly taught herein could be modified to allow the width between the viewing openings to be adjustable

What is claimed as new is as follows:

1. A kaleidoscope comprising a single hollow elongated housing having a front end and a rear end: a pattern-producing device adjacent said front end: reflecting means disposed within said housing, extending between said front and rear ends to define a varying composite image when viewed: a binocular eyepiece assembly adjacent to said rear end, providing means for a two-eyed user to view said varying composite image with both eyes simultaneously.

2. A kaleidoscope comprising a single hollow elongated housing having a front end and a rear end: a pattern-producing device adjacent said front end: reflecting means disposed within said housing, extending between said front and rear ends to define a varying composite image when view a binocular eyepiece assembly adjacent to said rear end, providing means for a two-eyed user to view said varying composite image with both eyes simultaneously, said binocular eyepiece assembly containing four reflective surfaces mounted at 135 degrees and 225 degrees to the long axis of said housing at said rear end so as to reflect light traveling in the direction of the long axis of said housing from said front end through the left half of said rear end 90 degrees to the left and light traveling from said front end through the right half said rear end 90 degrees to the right: one of the second two reflective surfaces positioned at 180 degrees to each of said first reflective surfaces and displaced laterally so as to reflect light reflected laterally off said first reflective surfaces at 90 degrees to the rear, thus returning the light traveling through the housing to its original direction while displacing the left half to the left and the right half to the right.

3. A kaleidoscope comprising a single hollow elongated housing having a front end and a rear end: a pattern-producing device adjacent said front end: reflecting means disposed within said housing, extending between said front and rear ends to define a varying composite image when viewed: a binocular eyepiece assembly adjacent to said rear end, providing means for a two-eyed user to view said varying composite image with both eyes simultaneously, said binocular eyepiece assembly containing reflective surfaces positioned such that light light traveling in the direction of the long axis of said housing from said front end will be reflected first at an angle to its original direction and then to the rear, thus returning the light traveling through the housing to its original direction while displacing part to the left and part to the right.

* * * * *